Patented Nov. 8, 1927.

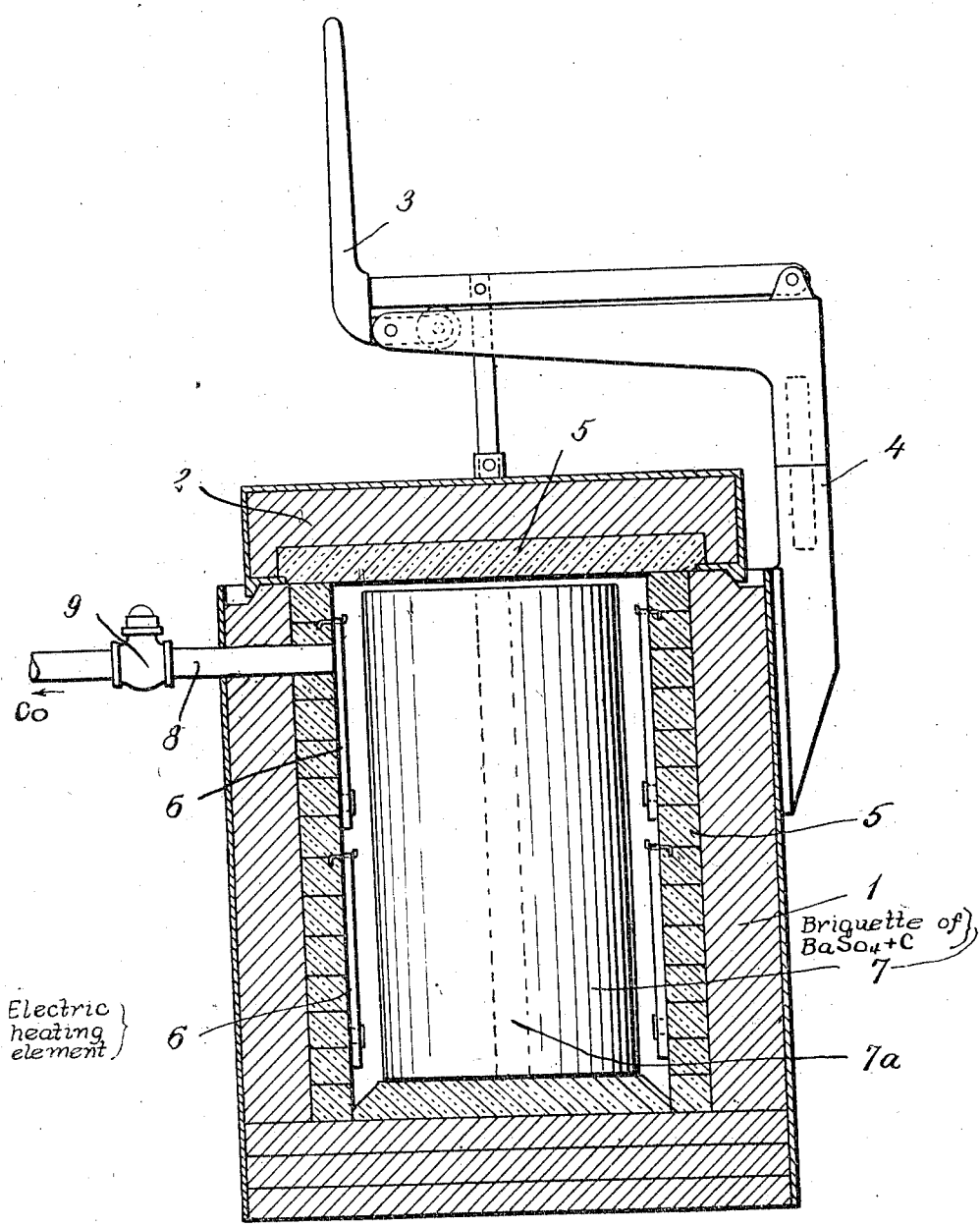

1,648,870

UNITED STATES PATENT OFFICE.

GORDON RICHARDSON, OF NEW YORK, N. Y., ASSIGNOR OF ONE-FOURTH TO PHANOR J. EDER, OF FOREST HILLS, NEW YORK.

PROCESS FOR MANUFACTURING BARIUM SULPHIDE.

Application filed April 8, 1925. Serial No. 21,556.

In the ordinary manufacture of barium sulphide from barytes, the ground ore is mixed with coke, or other suitable reducing reagent, and heated in an open calcining furnace or sometimes in a rotating furnace of the Brückner type. Under these circumstances, I have found that while the barium sulphate is reduced, the furnace gases mixed with the nitrogen of the atmosphere react with the barium sulphide to form compounds such as sulphites, cyanides, and sulphocyanides, so that in practice it is not easy to secure more than eighty per cent conversion of the barytes into water-soluble barium sulphide. Moreover, these other compounds such as cyanides or sulphocyanides I have found to be very troublesome and difficult if not impossible to eliminate; and for many purposes, such as the manufacture of lithopone, are deleterious, lithopone, of course, being a white paint comprising barium sulphate and zinc sulphide.

In the manufacture of lithopone it is desirable that the interacting chemicals, viz: zinc sulphate and barium sulphide, should be of exceptional purity in order that the resulting mixture of barium sulphate and zinc sulphide should not have their pure whiteness impaired.

It is true that the cyanide, sulphocyanide, or complex sulphocyanides of zinc such as zinc ferrocyanide, are more or less colorless, but unlike zinc sulphide, which is very stable, these cyanogen compounds upon exposure to the influence of light, air and moisture, are apt to alter and become decomposed, and in my opinion the darkening, or greying, of many varieties of lithopone paints from exposure is due to the presence of these undesirable compounds.

In my process I prevent the formation of these cyanogen compounds and thus eliminate any subsequent difficulties resulting from their presence in the finished lithopone or other product or process wherein substantially pure barium sulphide is advantageously usable.

Describing now my process,—when the soft compact variety of barytes is used, this may at once be ground without any preliminary treatment. When, however, the hard crystalline variety is used, I have found it advisable to first heat this to a dull redness, under which treatment the mineral decrepitates and flies to pieces and permits it to be finely ground much more easily.

To insure a good conversion to barium sulphide, the barytes should be ground to 100 degrees mesh or finer. It is then mixed carefully in a ball-mill with a quantity of charcoal calculated in amount to be about two per cent in excess of that required theoretically to reduce the mineral. A stiff paste of the combined barytes and charcoal is then made with molasses or dextrin. The mass is then molded into cylindrical form 6 or 8 inches, more or less, in diameter and from 12 to 20 inches, more or less, in length. The cylinder is made hollow in the center in the direction of its axis, the bore being one inch, more or less, in diameter.

This hollowing of the cylinder serves a double purpose. Thus, in the subsequent heating of the cylinder, much time would be lost (if there were no hollow bore) to insure the complete conversion of the material in the center, and in the second place, the opening permits the rapid elimination of the gases formed in the decomposition of the mineral.

The cylinders are now carefully dried and should be of such a density or hardness preferably that they will resist any ordinary handling or light blows, and, in fact, should almost possess a ringing tone when struck with a light object. Under these circumstances, the conduction of heat through the mass is very much facilitated.

The aforesaid cylindrical briquettes are now heated to redness in externally heated retorts closed against the access of air to their interior, or better still internally heated retorts or chambers such as in electric furnaces of the resistor type in which the resistance elements are located in or on the inside wall of the furnace surrounding the prepared cylinder. Each furnace preferably receives rather snugly a single cylinder leaving only enough clearance at the sides for a pair of tongs, or a like implement, to be used to insert and remove the briquette from the furnace, the object being to minimize the amount of air initially contained in the furnace. During the heating operation, the furnace is, of course, kept closed against the access of air to the contained briquette. On the other hand, means is provided for the escape from the chamber, retort or furnace of the quantity of carbon monoxide formed by the reducing action of the charcoal or carbon in the briquette on the barium sulphate thereof in accordance with the following equation:

$$BaSO_4 + 4C = BaS + 4CO.$$

Since the quantity of carbon monoxide is considerable, it should preferably be conserved and used either for the preliminary heating and drying of the briquettes or for other desirable purposes. The temperature used in said electric furnace may be about 1800° F. and each briquette will be heated from two to two and one-half hours, this varying, of course, with the size of the briquettes and the size of the furnaces. In any event, the temperature and duration of the heat should be such as to effectually complete the above reaction.

The annexed drawing diagrammatically illustrates one form of electric furnace with which my process can be carried out. In said drawing, 1 is the cylindrical body of the furnace; 2 its lid adapted to be opened and closed by the handle-means 3 operatively supported by the bracket 4 from the body of the furnace. Of course, said body and lid are provided with a suitable refractory lining 5. 6—6 are the electric resistor heating elements supported against the cylindrical interior of the lining of the body.

7 is the cylindrical briquette itself having a hollow core 7ª. 8 is a gas-escape pipe leading from the interior of the furnace and controlled by a valve 9 permitting gases to escape from the furnace but not to return thereto. The free end of this pipe may lead to a gas-storage tank or other means for disposing of the gas.

By my process it will be seen that the reduction of the barytes to barium sulphide takes place in a reducing atmosphere of carbon monoxide and without access thereto of atmospheric air, and I obtain a very high yield of barium sulphide from the aforesaid reaction which takes place from the heating of the briquette, said barium sulphide being free from contamination with the aforesaid deleterious cyanogen compounds.

After the heating treatment in the retort for the required period, the briquette may be removed and covered with charcoal while it cools to keep it out of contact with atmospheric air. Then the briquettes may be broken up and dissolved in water to make a solution of the barium sulphide, whereupon said solution is filtered. To make the lithopone, said barium sulphide solution is then added to a solution of zinc sulphate, whereupon the following reaction takes place with the precipitation of barium sulphate and zinc sulphide in substantially pure form ready to make up into lithopone or into any other suitable or desirable product:

$$BaS + ZnSO_4 = BaSO_4 + ZnS.$$

What I claim is:

1. The process of making a substantially cyanogen-free barium material with an enlarged yield thereof adapted for the manufacture of lithopone, etc., which comprises grinding barium sulphate to one hundred mesh or finer and intimately mixing same with finely divided carbon substantially free from nitrogen, briquetting said mixture and heating said briquettes in a substantially non-oxidizing and non-nitrogenous atmosphere, thereby converting the barium sulphate to barium sulphide, said process readily giving a higher than 80% yield of barium sulphide.

2. The process of claim 1 further characterized by the briquettes being formed of large size with hollow cores for the rapid penetration of the heat through the entire body of the several briquettes and for the ready escape from the body of the briquettes of the gas generated by the reaction.

Signed at New York, in the county of New York and State of New York, this third day of April, A. D. 1925.

GORDON RICHARDSON.